(12) United States Patent
Breuer et al.

(10) Patent No.: US 10,590,898 B2
(45) Date of Patent: Mar. 17, 2020

(54) INTERNAL COMBUSTION ENGINE WITH INJECTION DEVICE ARRANGED IN THE CYLINDER BARREL, AND METHOD FOR OPERATING AN INTERNAL COMBUSTION ENGINE OF SAID TYPE

(71) Applicant: Ford Global Technologies, LLC, Dearborn, MI (US)

(72) Inventors: Albert Breuer, Cologne (DE); Thomas Lorenz, Cologne (DE); Maziar Khosravi, Cologne (DE); Helmut Hans Ruhland, Eschweiler (DE)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 15/630,124

(22) Filed: Jun. 22, 2017

(65) Prior Publication Data
US 2018/0003140 A1  Jan. 4, 2018

(30) Foreign Application Priority Data

Jul. 4, 2016 (DE) .................... 10 2016 212 084

(51) Int. Cl.
*F02M 61/14* (2006.01)
*F02B 1/08* (2006.01)
(Continued)

(52) U.S. Cl.
CPC ............... *F02M 61/14* (2013.01); *F01P 3/02* (2013.01); *F02B 1/08* (2013.01); *F02B 1/10* (2013.01); *F02B 5/00* (2013.01); *F02B 17/005* (2013.01); *F02B 23/104* (2013.01); *F02M 69/045* (2013.01); *F01P 2003/024* (2013.01);
(Continued)

(58) Field of Classification Search
CPC .... F01P 3/02; F02M 61/14; F02B 1/04; F02B 1/10; F02B 5/00
See application file for complete search history.

(56) References Cited

U.S. PATENT DOCUMENTS 5,421,301 A * 6/1995 Feuling ................. F02B 23/104
123/298
6,928,978 B2   8/2005 Iwahashi et al.
(Continued)

FOREIGN PATENT DOCUMENTS

DE           698242 C     11/1940
DE         2445492 A1     4/1976
(Continued)

*Primary Examiner* — Kevin A Lathers
(74) *Attorney, Agent, or Firm* — Geoffrey Brumbaugh; McCoy Russell LLP (57) ABSTRACT

Examples are directed to a fuel injection device positioned in a cylinder liner. In one example, a cylinder includes a combustion chamber which is jointly formed by a piston crown of a piston, by a cylinder barrel which laterally delimits the combustion chamber, and by a cylinder head. The cylinder includes an injection device positioned in the cylinder barrel for direct introduction of fuel into the combustion chamber, which injection device has at least one opening which, during a course of an injection process, is configured to be activated to introduce fuel into the combustion chamber, the injection device terminating flush, at a combustion chamber side, with the cylinder barrel.

20 Claims, 4 Drawing Sheets

(51) Int. Cl.
  *F02M 69/04* (2006.01)
  *F02B 23/10* (2006.01)
  *F02B 1/10* (2006.01)
  *F02B 5/00* (2006.01)
  *F01P 3/02* (2006.01)
  *F02B 17/00* (2006.01)
  *F02B 75/12* (2006.01)

(52) U.S. Cl.
  CPC ... *F02B 2023/106* (2013.01); *F02B 2075/125* (2013.01); *Y02T 10/123* (2013.01); *Y02T 10/125* (2013.01)

(56) References Cited

U.S. PATENT DOCUMENTS

| | | |
|---|---|---|
| 8,381,519 B2 | 2/2013 | Singh et al. |
| 9,181,851 B1 | 11/2015 | Bandyopadhyay et al. |
| 2003/0085309 A1* | 5/2003 | Iwano .............. F02M 51/0682 239/585.1 |
| 2003/0127068 A1* | 7/2003 | Hiraya ................ F02B 23/101 123/276 |
| 2007/0000476 A1* | 1/2007 | Mizobuchi ........... F02B 23/104 123/305 |
| 2007/0181094 A1* | 8/2007 | Katou ............... F02M 61/1806 123/298 |
| 2011/0219752 A1 | 9/2011 | Gonze et al. |
| 2014/0070650 A1 | 3/2014 | Brantley |

FOREIGN PATENT DOCUMENTS

| | | |
|---|---|---|
| DE | 102011050087 A1 | 11/2012 |
| EP | 0997611 A2 | 5/2000 |
| EP | 1770257 A2 | 4/2007 |
| JP | H09177641 A | 7/1997 |
| JP | 2015096727 A | 5/2015 |

\* cited by examiner

INTERNAL COMBUSTION ENGINE WITH INJECTION DEVICE ARRANGED IN THE CYLINDER BARREL, AND METHOD FOR OPERATING AN INTERNAL COMBUSTION ENGINE OF SAID TYPE

RELATED APPLICATIONS

This application claims priority to German Patent Application No. 102016212084.0, filed Jul. 4, 2016. The entire contents of the above-referenced application are hereby incorporated by reference in its entirety for all purposes.

FIELD

The disclosure relates to a direct-injection internal combustion engine.

BACKGROUND/SUMMARY

Internal combustion engines have a cylinder block and at least one cylinder head which are connected to one another to form the cylinders and the combustion chambers thereof. The cylinder block, as the upper crankcase half, generally serves for the mounting of the crankshaft and for accommodating the piston and the cylinder sleeve of each cylinder. The piston may also, with the omission of a sleeve as an intermediate element, be mounted and guided directly in a bore of the block. In the context of the present disclosure, both the cylinder sleeve and the bore are subsumed under the expression "cylinder barrel".

The cylinder head normally serves for accommodating the valve drives required for the charge exchange. During the course of the charge exchange, the discharge of the combustion gases via the exhaust-gas discharge system takes place via the at least one outlet opening, and the feed of the combustion air via the intake system takes place via the at least one inlet opening of the cylinder. In the case of four-stroke engines, use is typically made almost exclusively of lifting valves for the control of the charge exchange. The valve, including the associated actuating mechanism, is referred to as valve drive.

The crankshaft which is mounted in the crankcase absorbs the connecting rod forces and transforms the oscillating stroke movement of the pistons into a rotational movement of the crankshaft. The upper crankcase half formed by the cylinder block is regularly supplemented by the oil pan, which can be mounted on the cylinder block and which serves as the lower crankcase half.

In the development of internal combustion engines, it is constantly sought to minimize fuel consumption and reduce pollutant emissions.

Fuel consumption poses a problem in particular in the case of Otto-cycle engines, that is to say in the case of spark-ignition internal combustion engines. The reason for this lies in the principle of the operating process of the traditional Otto-cycle engine. The traditional Otto-cycle engine operates with external mixture formation and a homogeneous fuel-air mixture, in which the desired power is set by varying the charge of the combustion chamber, that is to say by quantity regulation. By adjusting a throttle flap which is provided in the intake system, the pressure of the inducted air downstream of the throttle flap can be reduced to a greater or lesser extent. For a constant combustion chamber volume, it is possible in this way for the air mass, that is to say the quantity, to be set by the pressure of the inducted air. This also explains why quantity regulation has proven to be disadvantageous specifically in part-load operation, because low loads require a high degree of throttling and a large pressure reduction in the intake system, as a result of which the charge exchange losses increase with decreasing load and increasing throttling.

One approach for dethrottling the Otto-cycle working process is to utilize direct fuel injection. The injection of the fuel directly into the combustion chamber of the cylinder is considered to be a suitable measure for noticeably reducing fuel consumption even in Otto-cycle engines. The dethrottling of the internal combustion engine is realized by virtue of quality regulation being used within certain limits.

With the direct injection of the fuel into the combustion chamber, it is possible in particular to realize a stratified combustion chamber charge, which can contribute significantly to the dethrottling of the Otto-cycle working process because the internal combustion engine can be leaned to a great extent by means of the stratified charge operation, which offers thermodynamic advantages in particular in part-load operation, that is to say in the lower and middle load range, when only small amounts of fuel are to be injected.

Direct injection is characterized by an inhomogeneous combustion chamber charge which is not characterized by a uniform air ratio but which generally has both lean ($\lambda>1$) mixture parts and rich ($\lambda<1$) mixture parts. The inhomogeneity of the fuel-air mixture is also a reason why the particle emissions known from the diesel engine process are likewise of relevance in the case of the direct-injection Otto-cycle engine, whereas said emissions are of almost no significance in the case of the traditional Otto-cycle engine.

There is relatively little time available for the injection of the fuel, for the mixture preparation in the combustion chamber, specifically the mixing of air and fuel and the preparation of the fuel within the context of preliminary reactions including evaporation, and for the ignition of the prepared mixture.

The resulting demands placed on the mixture formation relate not only to the direct-injection Otto-cycle engine but basically to any direct-injection internal combustion engine, and thus also to direct-injection diesel engines.

Since, in the case of direct injection, there is only little time available for the mixture formation, there is a need for measures with which the mixture formation is assisted and accelerated in order to substantially homogenize the fuel-air mixture before the ignition, at least as long as there is no demand for stratified-charge operation. In this context, the distribution of the fuel in the combustion chamber, and thus also the injection of the fuel, are of particular importance.

In the case of the direct-injection Otto-cycle engine, a distinction can be made between substantially three methods for mixture formation.

In the case of the air-controlled method, it is sought to influence the mixture formation by a movement forcibly imparted by the inlet flow as the air is inducted into the combustion chamber. It is sought in this way to achieve a good mixture of the inducted air with the injected fuel, wherein it is the intention for a direct impingement of the injected fuel on the internal walls of the combustion chamber to be prevented by the generated charge movement or flow.

For example, the generation of a so-called tumble or swirling flow can accelerate and assist the mixture formation. A tumble is an air vortex about an imaginary axis which runs parallel to the longitudinal axis, that is to say to the axis of rotation, of the crankshaft, by contrast to a swirl, which constitutes an air vortex whose axis runs parallel to the piston longitudinal axis, that is to say the cylinder longitudinal axis.

The arrangement and the geometry of the intake system, that is to say of the intake lines, have a significant influence on the charge movement and thus on the mixture formation, wherein the charge movement in the cylinder is concomitantly influenced by the combustion chamber geometry, in particular by the geometry of the piston crown or of a piston depression that is optionally provided in the piston crown. In the case of direct-injection internal combustion engines, use may be made of depressions that are rotationally symmetrical to the piston longitudinal axis, in particular omega-shaped depressions. Owing to the constricted space conditions in the cylinder head, an optimization of the intake lines with regard to mixture formation and charge exchange may not be possible, or may not be fully possible, or may be possible only if disadvantages are accepted elsewhere.

In the case of the wall-controlled method, the fuel is injected into the combustion chamber in such a way that the injection jet is purposely directed toward a wall delimiting the combustion chamber, preferably into a depression provided on the piston crown. Here, it is the intention for the fuel jet to be, as a result of the impingement, broken up into multiple jet parts and diverted such that as large an area of the combustion chamber as possible is encompassed by the fuel jets. In particular, some of the injected fuel must be diverted into the vicinity of the ignition device in order to form an ignitable fuel-air mixture there with the inducted air.

Whereas it is the case in the air-controlled method that a direct impingement of the injected fuel on the combustion chamber internal walls should be prevented, this is desired in the case of the wall-controlled method. The wetting of the combustion chamber internal walls with fuel promotes oil thinning, and disadvantageously increases the untreated emissions of unburned hydrocarbons and the particle emissions.

In the case of the jet-controlled method, the fuel is injected in targeted fashion in the direction of the ignition device, which is achieved by a corresponding orientation of the injection jets and a correspondingly coordinated arrangement of the injection device and ignition device, for example by an arrangement of both the ignition device and also the injection device centrally in the cylinder head on the side facing the piston crown.

The fuel is transported and distributed substantially owing to the impetus of the injection jets, such that the mixture formation is relatively independent of the combustion chamber geometry, which constitutes a significant advantage in relation to the two other methods. The jet-controlled method is suitable in particular for stratified-charge operation of the internal combustion engine, because firstly, an ignitable mixture can be formed in a closely confined area around the ignition device, and secondly, a low fuel concentration can be realized in large areas of the combustion chamber.

Most methods for mixture formation exhibit both an air-controlled component and a jet-controlled component.

In some examples, the injection device is arranged in the cylinder head on the side facing the piston crown. Depending on the penetration depth of the injection jets, the injected fuel quantity and the injection time, that is to say the position of the piston, a greater or lesser fraction of the fuel impinges on the combustion chamber internal walls during the injection, in particular on the piston crown and the cylinder barrel, and mixes with the oil film adhering thereto. The fuel passes together with the oil into the crankcase and thus contributes significantly to oil thinning. The wetting of the combustion chamber internal walls with fuel furthermore has an adverse effect on the untreated emissions of unburned hydrocarbons and on the particle emissions.

Use may therefore also be made of injection devices whose injection jets exhibit a reduced or small penetration depth into the combustion chamber. In practice, it has however been found that, despite a reduced penetration depth, the combustion chamber internal walls are wetted with fuel, specifically even if the injection jets do not directly strike the combustion chamber internal walls. The cause of this is non-evaporated liquid fuel which, in the form of fuel droplets, is transported to the combustion chamber internal walls, and wets these, owing to the charge movement in the combustion chamber.

In some examples, the cylinders of the internal combustion engine are each equipped with an injection nozzle in the region of the cylinder barrel. The injection nozzle of a cylinder is in this case oriented toward the cylinder head; in some cases toward the outlet valve of the cylinder. This measure is intended to assist and accelerate the evaporation of the fuel particles or fuel droplets and thus assist and accelerate the mixture formation. At the same time, the head and the closed outlet valve are cooled by way of fuel. It is also sought to realize advantages in terms of pollutant emissions. It is also possible for two injection nozzles to be provided, which may possibly interact with one another, whereby it is sought to further improve the mixture formation. U.S. Pat. No. 5,421,301 describes such an internal combustion engine.

An injection nozzle which is oriented toward the cylinder head—as described in U.S. Pat. No. 5,421,301—supplies fuel only to the cylinder-head-side region of the combustion chamber during the course of the injection process, whereas the region of the combustion chamber between the injection device and bottom dead center, that is to say the piston-side region of the combustion chamber, remains disregarded during the injection.

The arrangement of the injection device in the region of the cylinder barrel yields further disadvantages. For example, an injection device provided in the region of the cylinder barrel is received by a recess or bore in the cylinder barrel, wherein the injection device is generally arranged in a sunken position such that a dead volume, in which injected fuel can and does collect, forms between the combustion-chamber-side tip of the injection device and the virtual inner envelope surface of the cylinder barrel, which also approximately constitutes the running surface of the piston. Fuel and coking residues resulting from incomplete combustion of fuel in the presence of a deficiency of oxygen are deposited on the injection device.

The deposition of liquid fuel on the injection device leads to increased untreated emissions of unburned hydrocarbons. The deposits on the injection device also lead to increased particle emissions of the internal combustion engine. This is because injected fuel accumulates in the porous coking residues, which fuel, often toward the end of the combustion when the oxygen provided for the combustion has been almost completely consumed, undergoes incomplete combustion and forms soot, which contributes to the increase in untreated particle emissions of the internal combustion engine.

Coking residues may also become detached from the injection device for example as a result of mechanical loading caused by a pressure wave propagating in the combustion chamber or the action of the injection jet. The residues detached in this way not only increase the untreated particle emissions of the internal combustion engine but may also lead to damage, and for example impair the functional capability of exhaust-gas after treatment systems provided in the exhaust-gas discharge system.

Furthermore, the coking residues can change the geometry of the injection device, in particular can adversely affect the through flow characteristic and/or impede the formation of the injection jet, and thereby disrupt the mixture preparation.

Additional concepts may be intended to counteract the build-up of coking residues and/or which serve to deplete deposits of coking residues, that is to say to remove said coking residues from and clean the combustion chamber. The German laid-open specification DE 10 199 45 813 A1 describes a concept of said type. Measures proposed for cleaning the combustion chamber include the targeted initiation of knocking combustion and/or the introduction of a cleaning fluid into the intake combustion air. Both measures may be regarded as relevant with regard to fuel consumption and pollutant emissions. The European patent EP 1 404 955 B1 describes an internal combustion engine whose at least one combustion chamber has, at least in regions, a catalytic coating on the surface for the purposes of oxidation of coking residues.

The inventors herein have recognized issues with the above approaches. For example, the concepts described above generally relate to an injection nozzle arranged in the cylinder head and projecting into the combustion chamber, and are not suitable for injection devices arranged in sunken fashion in the region of the cylinder barrel, that is to say for the removal or reduction of fuel or coking residues situated in a depression, that is to say in the dead volume.

Accordingly, an example approach is provided herein to at least partly address the above issues. In one example, a direct-injection internal combustion engine includes a cylinder head with a cylinder, the cylinder having at least one inlet opening for supply of combustion air via an intake system and at least one outlet opening for discharge of the exhaust gases via an exhaust-gas discharge system, the cylinder further comprising a combustion chamber which is jointly formed by a piston crown of a piston, by a cylinder barrel which laterally delimits the combustion chamber, and by the cylinder head, the piston being movable along a piston longitudinal axis between a bottom dead center and a top dead center. The engine includes an injection device positioned in the cylinder barrel for direct introduction of fuel into the combustion chamber, which injection device has at least one opening which, during a course of an injection process, is configured to be activated to introduce fuel into the combustion chamber, the injection device terminating flush, at a combustion chamber side, with the cylinder barrel.

In this way, the fuel injection device is mounted in the cylinder barrel (e.g., cylinder liner) and has a combustion-chamber-side front face that is flush with the inner surface of the cylinder liner, without forming a dead volume. In this way, the risk of fuel deposits and coking residues on the injection device is eliminated or reduced.

In the internal combustion engine according to the disclosure, the injection device of a cylinder terminates flush, at the combustion chamber side, with the cylinder-specific cylinder barrel. In the context of the present disclosure, this means firstly that at least the combustion-chamber-side tip of the injection device contacts a virtual inner envelope surface of the cylinder barrel, which approximately forms the running surface of the piston. In this way, the dead volume that forms between the combustion-chamber-side end of the injection device and the envelope surface of the cylinder barrel is reduced, and in some cases eliminated entirely.

Along with the dead volume, the risk of fuel deposition on the injection device or on the tip thereof and the risk of formation of coking residues are also reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Mixture preparation in direct injecting engines poses challenges because of the negative impact caused by any wall wetting. If the fuel spray hits the cylinder liner, the oil potentially gets diluted (e.g., the fuel may collect and then drain to the oil pan, where it may dilute the oil). If the fuel spray hits the piston, excessive soot formation may occur. One difficulty of centrally-mounted fuel injectors in the cylinder head is the alignment of flow directions of fuel and air. The lack of relative movement between both the fuel and air causes long duration of the evaporation, high penetration lengths of the spray, and thus high probability of wall wetting.

The injector at the side of the cylinder head, the so called side-mounted direct-injector, cannot make full use of being side-injected because of the proximity of the injector to the intake valves and the limited freedom in positioning because of the constriction in the cylinder head.

According to embodiments disclosed herein, the fuel injector may be positioned flush-mounted in the cylinder liner opposite of the intake valves at an optimized height and with an optimized angle to the cylinder axis. The position opposite of the intake valves ensures the inversely arranged flow directions of charge air coming through the intake valves and fuel coming from the injector. The high relative speed of the mixing of the fuel and air allows rapid evaporation and low penetration with minimal risk of wall wetting. Due to the availability of free space, it is possible to optimize the positioning height in the liner and the angle to the liner axis and to a certain extent also the angular position in the plane perpendicular to the cylinder axis. The injector mounted flush with the liner surface with a cylindrically ground front plate allows the piston rings to work without fixation and to keep the injector surface clean. Additionally, the flush position of the fuel injector eliminates a dead volume that may be present if the injector is recessed in the cylinder liner. The absence of dead volume may reduce hydrocarbon emissions normally associated with dead volumes.

Embodiments of the direct-injection internal combustion engine are provided in which the injection device terminates flush with the cylinder barrel in order to minimize a dead volume. Embodiments of the direct-injection internal combustion engine are provided in which the injection device terminates flush with the cylinder barrel without forming a dead volume. In the present case, the dead volume that forms between the combustion-chamber-side end of the injection device and the envelope surface of the cylinder barrel is eliminated entirely or substantially, that is to say to the extent technically feasible.

In this context, embodiments of the direct-injection internal combustion engine are provided in which the injection device is of cylindrical form at the combustion chamber side, such that a cylindrical tip, arranged at the combustion chamber side, of the injection device jointly forms, together with the cylindrical cylinder barrel, a virtual cylindrical envelope surface, whereby the dead volume is entirely eliminated.

Embodiments of the direct-injection internal combustion engine are provided in which the injection device is inclined relative to the piston longitudinal axis.

In this context, embodiments of the direct-injection internal combustion engine are provided in which the injection device is inclined relative to the piston longitudinal axis in the direction of the at least one cylinder head. In this way, the risk of undesired wetting of the piston with fuel is counteracted.

Embodiments of the direct-injection internal combustion engine are provided in which the injection device is oriented toward the at least one cylinder-specific inlet opening in such a way that the fuel emerging from the injection device is directed counter to the combustion air entering the combustion chamber via the inlet opening.

In the above embodiment, the injection device arranged in the cylinder barrel region is directed toward the cylinder-specific cylinder head, not toward the outlet, but rather toward the inlet of the cylinder, specifically toward the at least one cylinder-specific inlet opening, such that the fuel introduced into the combustion chamber can interact with the oppositely directed combustion air flowing into the combustion chamber.

The airflow entering the combustion chamber reduces the penetration depth of the injection jets of the injection device, whereby wetting of the combustion chamber internal walls with fuel is counteracted. Owing to the orientation of the injection device toward the cylinder head, it is the case in particular that wetting of the piston is prevented. Along with the wetting of the combustion chamber internal walls, a further cause of increased emissions of unburned hydrocarbons and increased particle emissions is also eliminated.

The orientation of the injection jets counter to the entering air flow is intended to assist and accelerate the evaporation of the fuel particles or fuel droplets and the widespread distribution of the fuel in the combustion chamber and advance and thereby improve the homogenization of the fuel-air mixture.

By contrast to the internal combustion engines with an injection device directed toward the cylinder head, it is the case according to the disclosure that, utilizing the flow dynamics of the inlet flow, both the cylinder-head-side region of the combustion chamber and the piston-side region of the combustion chamber are supplied with fuel.

If fuel passes into the intake system when the inlet opening is open, said fuel can serve for cleaning, and removing deposits from, the rear side of the associated inlet valve.

The homogenization of the fuel-air mixture is of increasing significance inter alia with regard to the reduction of nitrogen oxide emissions, because the formation of nitrogen oxides requires not only an excess of air but also high temperatures, and therefore use is increasingly being made of combustion methods with relatively low combustion temperatures, such as for example the HCCI method (Homogeneous Charge Compression Ignition), which is also referred to as the spatial ignition method or CAI method (Controlled Auto-Ignition) and which is based on a controlled auto-ignition of the fuel supplied to the cylinder. Owing to the low combustion temperatures, an internal combustion engine operated in the HCCI mode exhibits relatively low nitrogen oxide emissions and likewise low, or virtually absent, soot emissions.

Owing to the relatively low combustion temperatures and the associated relatively low temperature differences in the internal combustion engine, the heat losses are lower than in the case of conventionally operated internal combustion engines. This leads to a higher thermal efficiency.

Embodiments of the direct-injection internal combustion engine are provided in which the at least one cylinder-specific inlet opening is arranged in the cylinder-specific cylinder head.

Embodiments of the direct-injection internal combustion engine are provided in which each cylinder has at least two inlet openings for the supply of combustion air.

It is the object of valve drives to open and close the inlet and outlet openings of the cylinders at the correct times, with a fast opening of the greatest possible flow cross sections being sought during the charge exchange in order to keep the throttling losses in the inflowing and outflowing gas flows low and in order to ensure the best possible charging of the cylinder, and an effective, that is to say complete discharge of the combustion gases. The cylinders of an internal combustion engine are therefore preferably equipped with two or more inlet and outlet openings respectively.

For the above reasons, embodiments of the direct-injection internal combustion engine are therefore also provided in which each cylinder has at least two outlet openings for the discharge of the exhaust gases.

In the embodiments of the internal combustion engine in which a cylinder has no injection device in the cylinder-specific cylinder head, the structural space which is freed up as a result of the omission of the injection device in the cylinder head and which thus becomes available again or becomes additionally available can be utilized for the provision of a further inlet or outlet opening or for increasing the size of the openings provided. In both cases, the throttling losses during the charge exchange are noticeably reduced.

Embodiments of the direct-injection internal combustion engine may however also be provided in which each cylinder is equipped with an additional injection device which is arranged in the cylinder-specific cylinder head.

Then, each cylinder has two injection devices which interact with one another or jointly realize the widespread distribution of the fuel in the combustion chamber, whereby the mixture formation is further improved, and in particular the homogenization of the fuel-air mixture is accelerated. A second injection device may prove to be particularly advantageous at operating points at which large fuel quantities may be introduced into the cylinder. It is however also possible for each of the two injection devices to be utilized individually, such that, in predefinable operating points, only one of the two injection devices is used for the purposes of introducing fuel.

Embodiments of the direct-injection internal combustion engine may also be provided in which each cylinder is equipped with a further injection device which is arranged in the cylinder-specific intake system. By intake pipe injection, it would be possible, for example in part-load operation of the internal combustion engine, for fuel to be introduced into the intake system upstream of the inlet to a cylinder.

Embodiments of the direct-injection internal combustion engine are provided in which each cylinder is equipped with an ignition device for the purposes of initiating the applied ignition. The above embodiment relates to applied-ignition internal combustion engines, that is to say internal combustion engines which at least intermittently utilize an applied ignition.

Here, embodiments of the direct-injection internal combustion engine may be provided in which each cylinder is equipped with an additional ignition device for the purposes of initiating the applied ignition.

In the embodiments of the internal combustion engine in which a cylinder has no injection device in the cylinder-specific cylinder head, the structural space which is freed up as a result of the omission of the injection device in the cylinder head and which thus becomes available again or becomes additionally available can also be utilized for the provision of an ignition device or additional ignition device. If the ignition is then initiated at the two spaced-apart positions of the two ignition devices, flames propagate in the combustion chamber from said two positions, wherein the prepared fuel-air mixture situated in the combustion chamber is completely encompassed by a flame more quickly than would be observed, or would be the case, if only one ignition device were used. The fuel-air mixture burns through, as it were, more quickly, which can result in thermodynamic advantages.

Embodiments of the direct-injection internal combustion engine are provided in which the at least one cylinder head is provided with at least one coolant jacket in order to form a liquid-type cooling arrangement.

The heat released during the combustion by the exothermic, chemical conversion of the fuel is dissipated partially to the cylinder head and cylinder block via the walls which delimit the combustion chamber and partially to the adjacent components and the environment via the exhaust-gas flow. To keep the thermal loading of the cylinder head within limits, a part of the heat flow introduced into the cylinder head must be extracted from the cylinder head again.

It is fundamentally possible for the cooling arrangement to take the form of an air-type cooling arrangement or a liquid-type cooling arrangement. On account of the significantly higher heat capacity of liquids in relation to air, it is possible for significantly greater quantities of heat to be dissipated using a liquid-type cooling arrangement, for which reason internal combustion engines are generally equipped with a liquid-type cooling arrangement. In this context, it must be taken into consideration that the thermal load of the cylinder head is ever-increasing, inter alia because an increasing proportion of internal combustion engines is supercharged—by an exhaust-gas turbocharger or a mechanical supercharger. On account of the ever more dense packaging in the engine bay and the increasing integration of parts and components into the cylinder head, for example the integration of the exhaust manifold, the thermal loading of the cylinder head is increased, such that increased demands are placed on the cooling system and measures are taken to reliably prevent thermal overloading of the internal combustion engine. Efforts to use lighter materials for producing the head, which are less resistant to thermal load, furthermore increase the demands on the cooling arrangement.

If the internal combustion engine has a liquid cooling arrangement, a plurality of coolant ducts or at least one coolant jacket is generally formed in the cylinder head, which coolant ducts or coolant jacket conduct(s) the coolant through the cylinder head; this requires a highly complex cylinder head structure.

In the embodiments of the internal combustion engine in which a cylinder has no injection device in the cylinder-specific cylinder head, the structural space which is freed up as a result of the omission of the injection device in the cylinder head and which thus becomes available again or becomes additionally available can be utilized for the positioning of a coolant jacket in the cylinder head close to the combustion chamber and thus in the direct vicinity of the thermally most highly loaded regions of the head.

Embodiments are provided in which a coolant jacket is integrated in the cylinder head, which coolant jacket has a lower coolant jacket, which is arranged between the exhaust lines and the assembly area of the cylinder head, and an upper coolant jacket, which is arranged on that side of the exhaust lines which is situated opposite the lower coolant jacket.

Embodiments of the direct-injection internal combustion engine are provided in which a cylinder block which is connectable to the at least one cylinder head is equipped with at least one coolant jacket in order to form a liquid-type cooling arrangement, the at least one coolant jacket covering the cylinder barrel of at least one cylinder at least in regions.

Embodiments of the direct-injection internal combustion engine are provided in which the cylinder-specific piston is, for the purposes of sealing off the combustion chamber, equipped with at least one piston ring which is arranged in a piston skirt region which laterally delimits the piston.

In this context, embodiments of the direct-injection internal combustion engine are provided in which, when the piston is situated at top dead center, the at least one piston ring is positioned between the injection device and top dead center.

A piston situated at top dead center then covers the injection device arranged in the cylinder barrel region, such that the injection device is exposed to the cylinder pressure in unprotected fashion only when a piston moving toward bottom dead center uncovers the injection device at the combustion chamber side. The injection device is consequently subjected to lower pressures. This facilitates the sealing of the injection device. The design of the seal is facilitated simply owing to the fact that the region of the cylinder barrel is thermally less highly loaded than, for example, the cylinder head.

In principle, an injection can be performed only when the cylinder-specific piston, on its path toward bottom dead center, has passed the injection device and makes the combustion chamber accessible to the openings of the injection device.

A piston moving, that is to say oscillating between the dead centers can in some cases also clean, in particular mechanically clean, the injection device at the combustion chamber side.

In an example, a method for operating an internal combustion engine of a type described above includes at least one cylinder-specific inlet opening being at least intermittently opened during the course of an injection process.

That which has already been stated with regard to the internal combustion engine according to the disclosure also applies to the method according to the disclosure, for which reason reference is generally made at this juncture to the statements made above with regard to the internal combustion engine.

Embodiments of the method are provided in which at least one cylinder-specific inlet opening is opened before fuel is introduced by means of the injection device.

In general, the opening of an injection device is activated by virtue of said opening being connected to a fuel supply system, and thus opened up, for the purposes of introducing fuel into the cylinder. The injection process is then ended by virtue of the openings being separated from the fuel supply system, that is to say deactivated. The activation and/or deactivation of the openings may also be performed with the time offset.

Figure 1:
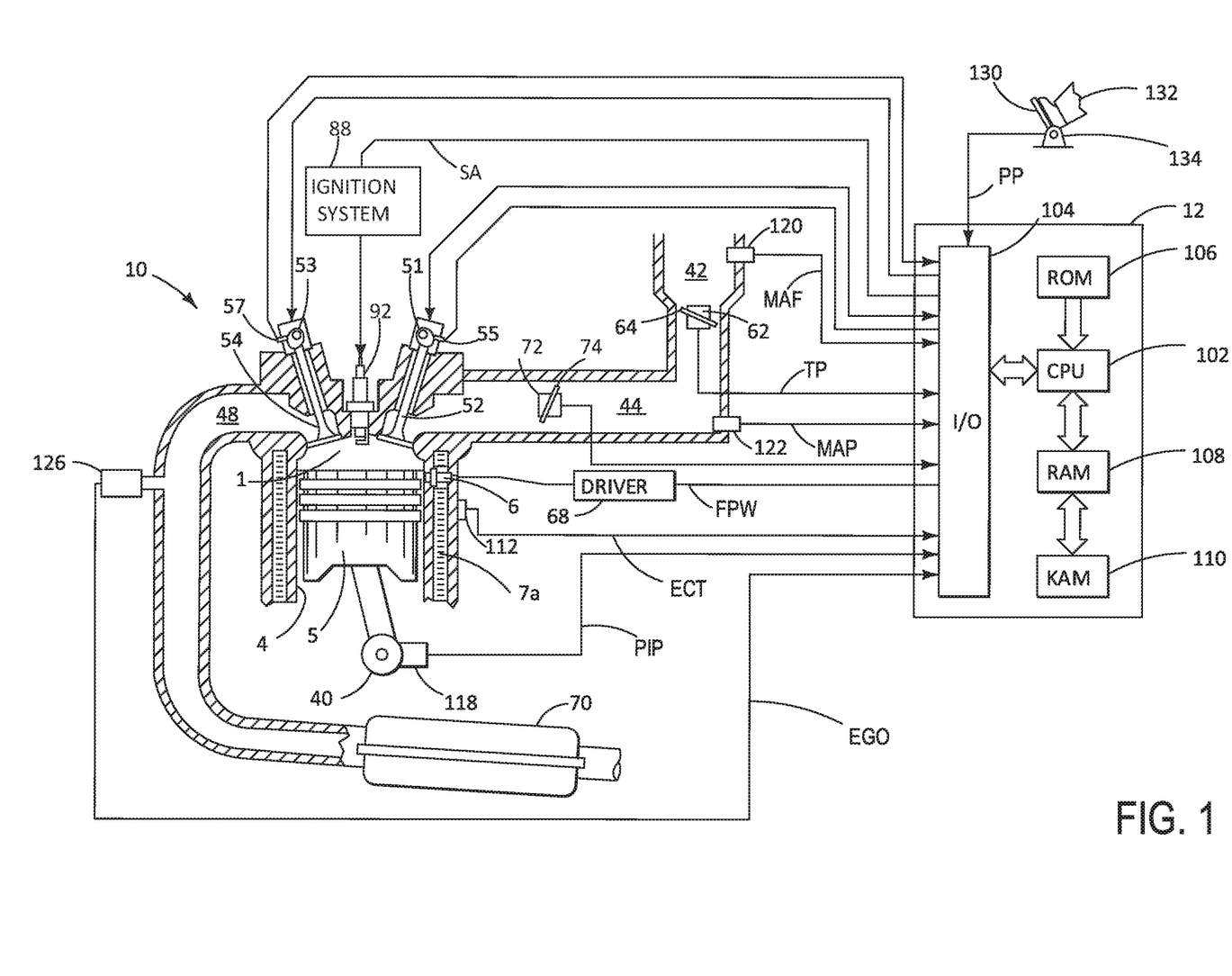
FIG. 1 schematically shows an example engine including a cylinder.

Referring now to FIG. 1, it includes a schematic diagram showing one cylinder 1 of a multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 1 of engine 10 may include combustion cylinder walls (also referred to herein as cylinder barrel 4) with piston 5 positioned therein. Piston 5 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 1 may receive intake air from intake manifold 44 via intake passage 42 and may exhaust combustion gases via exhaust passage 48. Intake manifold 44 and exhaust passage 48 can selectively communicate with combustion cylinder 1 via respective intake valve 52 and exhaust valve 54. In some embodiments, combustion cylinder 1 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 1 may alternatively include an intake valve controlled via electric valve actuation and an exhaust valve controlled via cam actuation including CPS and/or VCT systems.

Fuel injector 6 is shown coupled directly to combustion cylinder 1 for injecting fuel directly therein in proportion to the pulse width of signal FPW received from controller 12 via electronic driver 68. In this manner, fuel injector 6 provides what is known as direct injection of fuel into combustion cylinder 1. As shown, the fuel injector is mounted on the side of the combustion cylinder. In some examples, more than fuel injector may be present, such as on another side of the combustion cylinder or in the top of the combustion cylinder, for example. Fuel may be delivered to fuel injector 6 by a fuel delivery system (not shown) including a fuel tank, a fuel pump, and a fuel rail. In some embodiments, combustion cylinder 1 may alternatively or additionally include a fuel injector arranged in intake passage 42 in a configuration that provides what is known as port injection of fuel into the intake port upstream of combustion cylinder 1. It is to be understood that the position of the fuel injector in FIG. 1 is schematic and the fuel injector could be positioned in other locations. As will be explained in more detail below with respect to FIG. 2, the fuel injector may be positioned on an opposite side of the cylinder from the intake valve.

Intake passage 42 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 1 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion cylinder 1 via spark plug 92 in response to spark advance signal SA from controller 12, under select operating modes. Though spark ignition components are shown, in some embodiments, combustion cylinder 1 or one or more other combustion chambers of engine 10 may be operated in a compression ignition mode, with or without an ignition spark.

Exhaust gas sensor 126 is shown coupled to exhaust passage 48 upstream of exhaust after treatment device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Exhaust after treatment device 70 may include a gasoline particulate filter (GPF) and one or more emission control devices, such as a three way catalyst (TWC) coupled together or separately. In other embodiments, the one or more emission control devices may be a NOx trap, various other emission control devices, or combinations thereof.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 7a; a profile ignition pickup signal (PIP) from Hall effect sensor 118 (or other type) coupled to crankshaft 40; throttle position (TP) from a throttle position sensor; and absolute manifold pressure signal, MAP, from pressure sensor 122. Storage medium read-only memory 106 can be programmed with computer readable data representing instructions executable by processor 102 for performing the method described below as well as variations thereof. The controller 12 receives signals from the various sensors of FIG. 1 and employs the various actuators of FIG. 1 to adjust engine operation based on the received signals and instructions stored on a memory of the controller.

Figure 2:
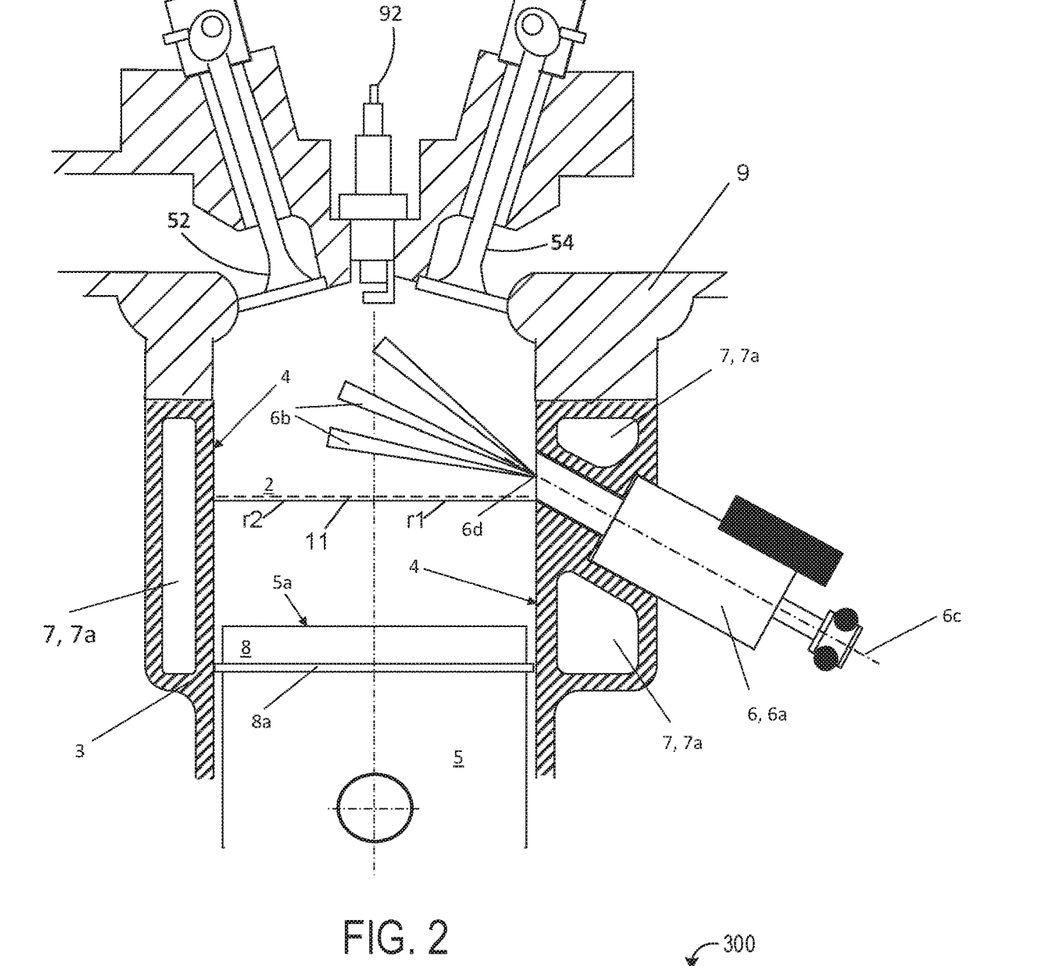
FIG. 2 schematically shows, in cross section, the cylinder of FIG. 1.

FIG. 2 schematically shows, in cross section, the fragment of the cylinder 1 of the engine 10 of FIG. 1.

An internal combustion engine of the stated type is used as a motor vehicle drive unit. Within the context of the present invention, the expression "internal combustion engine" encompasses Otto-cycle engines and diesel engines but also hybrid internal combustion engines, that is to say internal combustion engines that are operated using a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

The cylinder 1 has two outlet openings for the discharge of the exhaust gases via an exhaust-gas discharge system, each outlet opening being adjoined by an exhaust line, and each outlet opening being equipped with an outlet valve (also referred to as the exhaust valve 54) for the purposes of opening up the outlet opening during the course of the charge exchange. Furthermore, the cylinder 1 has two inlet openings for the supply of the combustion air via an intake system, each inlet opening being adjoined by an intake line, and each inlet opening being equipped with an inlet valve (also referred to as the intake valve 52) for the purposes of opening up the inlet opening during the course of the charge exchange (not illustrated).

Each cylinder 1 of the internal combustion engine comprises a combustion chamber 2 which is jointly formed by the piston crown 5a of a cylinder-specific piston 5, by a cylinder barrel 4 which laterally delimits the combustion chamber 2, and by the cylinder head 9. When the internal combustion engine is in operation, the piston 5 oscillates along a piston longitudinal axis 5b between a bottom dead center and a top dead center. In the embodiment illustrated in FIG. 2, the piston 5 is displaceably mounted directly, without a sleeve as an intermediate element, in a bore of the cylinder block 3, wherein the bore forms the cylinder barrel 4. For the sealing of the combustion chamber 2 with respect to the crankcase, the piston 5 is equipped with at least one piston ring 8a which is received by a piston skirt 8 which laterally delimits the piston 5.

The cylinder block 3 is equipped with multiple coolant jackets 7a in order to form a liquid-type cooling arrangement 7, wherein the liquid jackets/cooling sleeves 7a cover or surround the thermally loaded cylinder barrel 4 in regions.

Each cylinder 1 of the internal combustion engine is equipped, in the region of the cylinder barrel 4, with an injection device 6 for the direct introduction of fuel into the combustion chamber 2. In the present case, an injection nozzle 6a serves as injection device 6, which injection nozzle is inclined with its longitudinal axis 6c relative to the piston longitudinal axis 5b in the direction of the cylinder head and has multiple openings which, during the course of an injection process, are activated, that is to say opened up, for the purposes of introducing fuel into the combustion chamber 2. To end the injection process, the openings of the injection nozzle 6a are separated from the fuel supply system.

The injection nozzle 6a is directed toward a cylinder-specific inlet opening, specifically such that the fuel jets 6b emerging from the injection nozzle 6a are directed counter to the combustion air entering the combustion chamber 2 via the inlet opening.

The injection device 6 illustrated in FIG. 2 terminates flush with the cylinder barrel 4 without forming a dead volume. A dead volume which could form between the combustion-chamber-side end 6d of the injection device 6 and the envelope surface of the cylinder barrel 4 is thus eliminated entirely.

For this purpose, the injection device 6 is of cylindrical form at the combustion chamber side, such that the tip 6d of the injection device 6 forms, together with the cylindrical cylinder barrel 4, a virtual cylindrical envelope surface. Said virtual cylindrical envelope surface approximately also forms the running surface of the piston 5 or of the piston ring 8a in the cylinder barrel 4. As used herein, "virtual cylindrical envelope surface" represents a composite surface comprised of the inner wall/surface of the cylinder barrel (e.g., that face into the combustion chamber), the front face of the injection device, and any additional injective device components (such as a seal). Together, these surfaces form an effectively continuous "virtual" surface, such that although the inner surface of the cylinder barrel is interrupted by an opening housing the injection device, the injection device fits in the opening and has a front face that is flush with the inner surface. In other words, if the inner surface of the cylinder barrel were extended across the injection device, the inner surface would form a continuous, cylindrical envelope that would not bulge or recess in the region of the injection device.

Cylinder 1 includes a transverse axis 11 that is perpendicular to the cylinder axis (the cylinder axis is the dashed-dotted line in FIG. 2). The combustion-end-side 6d of the injection device (e.g., the front face) is flush with and curved similarly to the inner surface of the cylinder barrel 4. If a cross-section of the cylinder is taken along the transverse axis at a point that intersects the injection device (such as at a point shown in FIG. 2), a cross-section radius r1 from the cylinder axis to a given point on the injection device along the transverse axis is equal to a cross-section radius r2 from the cylinder axis to a given point on the cylinder barrel along the transverse axis. In this way, the front face of the injection device does not project into the combustion chamber, nor is the front face recessed away from the combustion chamber, but rather forms an effectively continuous surface with the inner surface of the cylinder barrel.

Figure 3:
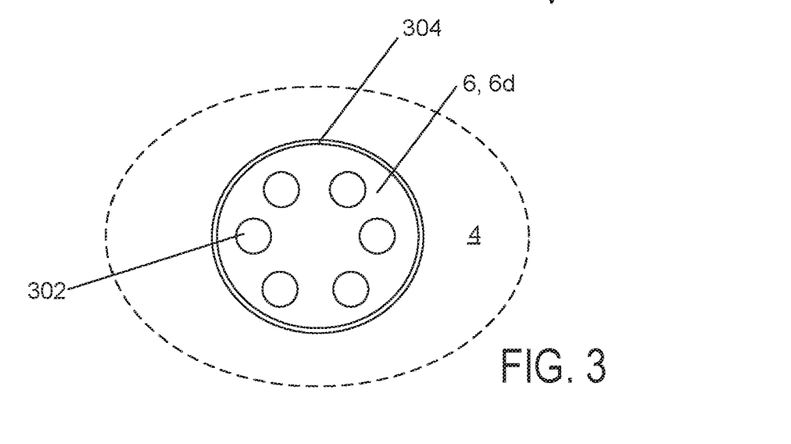
FIG. 3 schematically shows a head-on view of a fuel injection device.

FIG. 3 shows a cut-away view 300 of a region of the cylinder barrel. Specifically, the inner surface of the cylinder barrel 4 surrounding the injection device 6 is shown in a head-on direction (e.g., viewed head-on to the front face of the injection device). As shown, the injection device 6 includes the combustion-chamber-side end 6d (also referred to as the front face of the injection device) which is surrounded by and flush with the inner surface of the cylinder barrel 4. The injection device includes a plurality of nozzle holes, such as hole 302, through which fuel is injected. In some examples, a seal 304 may be present between the injection device 6 and the cylinder barrel 4. As appreciated by FIG. 3, the front face of the injection device is cylindrical. Further, the front face may be shaped to match the curvature of the cylinder barrel (e.g., the front face may be concave with a radius of curvature that matches a radius of curvature of the cylinder barrel).

Figure 4:
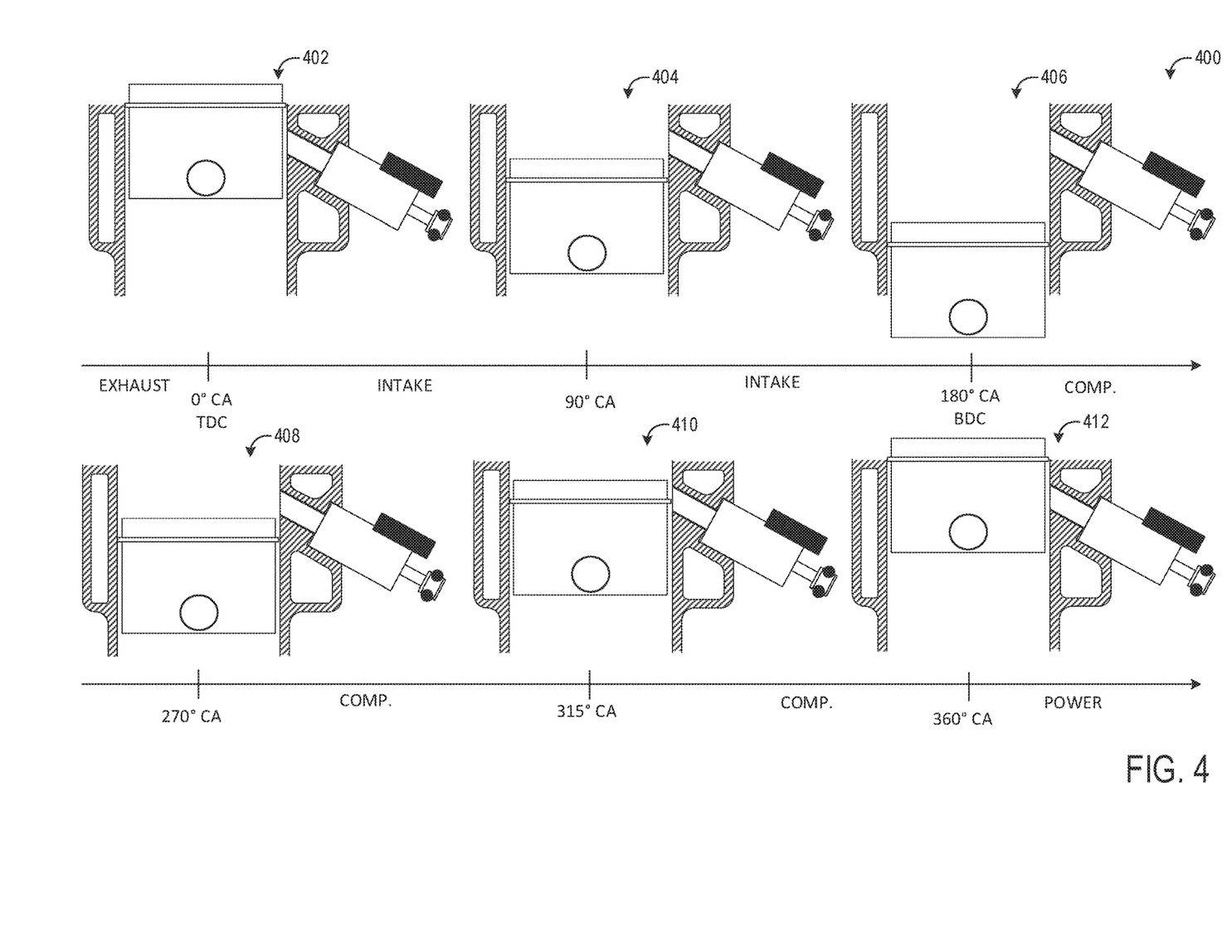
FIG. 4 is a timeline of example piston positions relative to a fuel injector during a portion of a cylinder cycle.

FIG. 4 shows a timeline diagram 400 illustrating movement of the piston relative to the injection device during a fuel injection event in the cylinder 1 of FIGS. 1-2. At the beginning of the intake stroke for the cylinder (at 0° crank angle (CA), when the piston is at top dead center), the piston is blocking the injection nozzle holes of the injection device, as shown at 402. Thus, the injection device is unable to inject fuel. As the piston travels downward, the nozzle holes of the injection device are exposed to the combustion chamber, for example at 90° CA as shown at 404. When the nozzle holes are exposed to the combustion chamber, fuel injection may commence at a timing specified by engine operating parameters. The nozzle holes remain exposed to the combustion chamber throughout the remained of the intake stroke and into the compression stroke. As shown at 406, the nozzle holes are exposed at 180° CA (bottom dead center), which is the end of the intake stroke, up until approximately 270° CA of the compression stroke, as shown at 408. After 270° CA, the piston moves upward and again blocks the nozzle holes. Thus, based on the position of the injection device and the piston movement, the injection device has an "injection window" during which fuel may be injected. In the example shown, the injection window may include part of the intake stroke (e.g., once the piston moves downward past the injection device) and part of the compression stroke (e.g., until the piston moves upward past the injection device). For example, the injection window may include 90° CA to 270° CA.

Additionally, when the piston moves past the injection device, a portion of the piston may contact the injection device, thus cleaning the injection device. As shown at 410, the piston ring may directly contact the front face of the injection device as the piston moves upward past the injection device during the compression stroke, e.g., around 315° CA. At the end of the compression stroke (e.g., 360° CA), the piston may be blocking the nozzle holes, although the piston may not be directly contacting the injection device.

It is to be appreciated that the crank angle timings depicted in FIG. 4 are exemplary and other timings for the injection window are within the scope of this disclosure. Further, during the power stroke and exhaust stroke, the nozzle holes may again be exposed to the combustion chamber. Thus, a secondary post-injection event may be performed during this time, for example to provide fuel to a downstream exhaust treatment device during a regeneration event.

Figure 5:
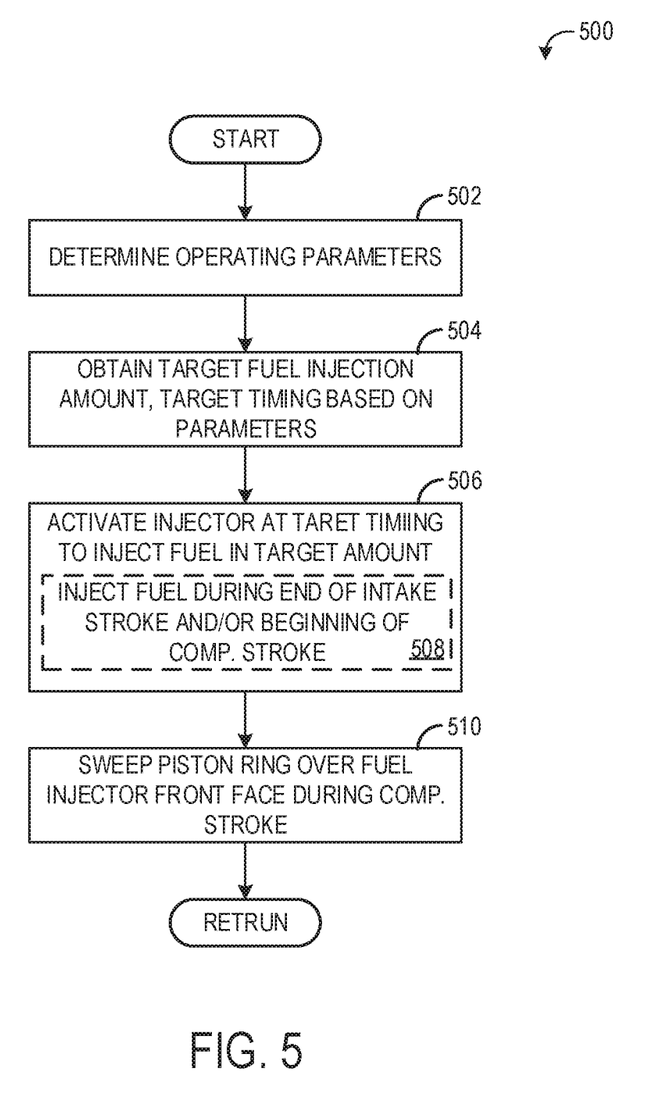
FIG. 5 is a flow chart illustrating a method for operating a fuel injector.

FIG. 5 is a flow chart illustrating a method 500 for injecting fuel from a fuel injector positioned in a cylinder barrel, such as injection device 6 of FIGS. 1-4. Instructions for carrying out method 500 and the rest of the methods included herein may be executed by a controller based on instructions stored on a memory of the controller and in conjunction with signals received from sensors of the engine system, such as the sensors described above with reference to FIG. 1. The controller may employ engine actuators (e.g., injection device 6) of the engine system to adjust engine operation, according to the methods described below.

At 502, method 500 includes determining operating parameters. The determined operating parameters may include engine speed, engine load, engine temperature, intake mass air flow, and other operating parameters. At 504, method 500 obtains a target fuel injection amount and a target fuel injection timing based on the determined operating parameters. For example, a target air-fuel ratio may be determined from a look-up table, logic rules, or other mechanism according to engine speed and load, and the fuel injection amount may be determined from the target air-fuel ratio and intake air mass flow. The fuel injection timing may be determined according to a look-up table based on engine speed and load and/or other parameters, such as engine temperature.

At 506, method 500 includes activating the fuel injector at the target fuel injection timing to inject the target amount of fuel. Activating the fuel injector may include injecting fuel during the end of the intake stroke and/or beginning of the compression stroke, as indicated at 508. As explained above with respect to FIG. 4, the fuel injector may be configured with an injection window during which fuel is able to leave the injector (due to the nozzle holes of the injector being exposed to the combustion chamber). The fuel may be injected during the injection window, at a specific time that is dictated by operating conditions (at least in some examples). For example, the fuel may be injected during the intake stroke, when the intake valve(s) is open. The intake valve may be open prior to commencement of fuel injection, and the fuel injection may be performed while the intake valve is still open. In this way, increased atomization and mixing of the fuel with the intake air may occur.

At 510, method 500 includes sweeping the piston ring over the fuel injector front face during the compression stroke. As the piston travels back toward top dead center during the compression stroke following the injection event, the piston ring may directly contact the face of the injector. In doing so, the injector face may be cleaned of excess fuel, soot, or other debris, which may prevent the fuel injector nozzle holes from clogging. Method 500 then returns.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A direct-injection internal combustion engine comprising:
a cylinder head with a cylinder, the cylinder having at least one inlet opening for supply of combustion air via an intake system and at least one outlet opening for discharge of exhaust gases via an exhaust-gas discharge system, the cylinder further comprising a combustion chamber which is jointly formed by a piston crown of a piston, by a cylinder barrel which laterally delimits the combustion chamber, and by the cylinder head, the piston being movable along a piston longitudinal axis between a bottom dead center and a top dead center; and
an injection device positioned in the cylinder barrel for direct introduction of fuel into the combustion chamber, which injection device has at least one opening which, during a course of an injection process, is configured to be activated to introduce fuel into the combustion chamber,
the injection device having a curved front face which terminates flush, at a combustion chamber side, with a curved face of the cylinder barrel.

2. The direct-injection internal combustion engine as claimed in claim 1, wherein the injection device terminates flush with the cylinder barrel without forming a dead volume.

3. The direct-injection internal combustion engine as claimed in claim 2, wherein the injection device is of cylindrical form at the combustion chamber side, such that a cylindrical tip, arranged at the combustion chamber side, of the injection device jointly forms, together with the cylindrical cylinder barrel, a virtual cylindrical envelope surface.

4. The direct-injection internal combustion engine as claimed in claim 1, wherein the cylinder is equipped with an additional injection device which is arranged in the cylinder head.

5. The direct-injection internal combustion engine as claimed in claim 1, wherein the cylinder is equipped with a further injection device which is arranged in the intake system.

6. The direct-injection internal combustion engine as claimed in claim 1, wherein a cylinder block which is connectable to the cylinder head is equipped with at least two coolant jackets in order to form a liquid-type cooling arrangement, the at least two coolant jackets covering the cylinder barrel of at least one cylinder at least in regions, and wherein the injection device is positioned between two coolant jackets of the cylinder barrel.

7. The direct-injection internal combustion engine as claimed in claim 1, wherein the piston is, for purposes of sealing off the combustion chamber, equipped with at least one piston ring which is arranged in a piston skirt region which laterally delimits the piston, and wherein, when the piston is situated at top dead center, the at least one piston ring is positioned between the injection device and top dead center.

8. The direct-injection internal combustion engine of claim 1, wherein the front face of the injection device has a radius of curvature that is the same as a radius of curvature of the face of the cylinder barrel.

9. The direct-injection internal combustion engine of claim 8, wherein the front face of the injection device is positioned to form a continuous curvature with an inner surface of the cylinder barrel.

10. The direct-injection internal combustion engine of claim 1, wherein the front face of the injection device includes a plurality of nozzle holes.

11. The direct-injection internal combustion engine of claim 1, wherein a seal surrounds the front face of the injection device.

12. A system, comprising:
a cylinder defined by a cylinder barrel, the cylinder barrel positioned in a cylinder head and a cylinder block; and
a fuel injector positioned within the cylinder barrel, the fuel injector including a curved front face positioned flush with a curved interior surface of the cylinder barrel and contacted by a piston.

13. The system of claim 12, wherein the cylinder comprises a cylinder axis and a transverse axis perpendicular to the cylinder axis, and where a first cross-sectional radius of the cylinder extending from the cylinder axis to a given point of the interior surface of the cylinder barrel along the transverse axis is equal to a second cross-sectional radius of the cylinder extending from the cylinder axis to a given point of the front face of the fuel injector along the transverse axis.

14. The system of claim 13, wherein the fuel injector front face comprises a plurality of nozzle holes, and wherein the front face of the fuel injector has a radius of curvature that matches a radius of curvature of the interior surface of the cylinder barrel.

15. The system of claim 12, wherein the front face of the fuel injector is contacted by a piston ring.

16. The system of claim 12, wherein the front face of the fuel injector is cylindrical in shape and has a concave curvature which matches a curvature of the interior surface of the cylinder barrel.

17. The system of claim 12, wherein the front face of the fuel injector includes a plurality of nozzle holes.

18. A method, comprising:
activating a fuel injector housed in a cylinder barrel defining a combustion chamber of a cylinder to inject fuel into the combustion chamber via a plurality of nozzle holes positioned on a front face of the fuel injector, the front face having a curved shape and positioned flush with a curved inner surface of the cylinder barrel, with a curvature of the front face of the fuel injector and a curvature of the inner surface of the cylinder barrel matching.

19. The method of claim 18, wherein activating the fuel injector comprises activating the fuel injector during an intake stroke of the cylinder.

20. The method of claim 19, further comprising, during a compression stroke following the intake stroke, contacting the front face of the fuel injector with a portion of a piston of the cylinder.

* * * * *